(12) United States Patent
Inoue et al.

(10) Patent No.: US 6,215,963 B1
(45) Date of Patent: *Apr. 10, 2001

(54) FIELD FRAME SWITCHER

(75) Inventors: Yoshiyuki Inoue, Izumi (JP); Wong Ngai Kit, Selangor (MY); Yoshito Konishi, Sakai (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/200,917

(22) Filed: Nov. 30, 1998

(30) Foreign Application Priority Data

Dec. 1, 1997 (JP) .................................................. 9-330288

(51) Int. Cl.⁷ .................................................... G03B 13/10
(52) U.S. Cl. ........................... 396/378; 396/380; 396/435
(58) Field of Search .................................... 396/378, 380, 396/435, 436

(56) References Cited

U.S. PATENT DOCUMENTS

| 5,506,647 | 4/1996 | Sakamoto et al. | 356/378 |
| 5,732,297 | * 3/1998 | Tanaka et al. | 396/380 |

* cited by examiner

*Primary Examiner*—David M. Gray
(74) *Attorney, Agent, or Firm*—McDermott, Will & Emery

(57) ABSTRACT

A camera has an AE sensor 10 and a display member 32 disposed in the vicinity of the focusing screen 4, and a field frame switcher having a light interrupting wing capable of changing a field frame. The light-interrupting wing crosses and interrupts a predetermined luminous flux path used for obtaining information necessary for photographing while the field frame is changed. The light-interrupting wing is disposed close to the predetermined luminous flux path to reduce the space needed to house the structure.

21 Claims, 9 Drawing Sheets

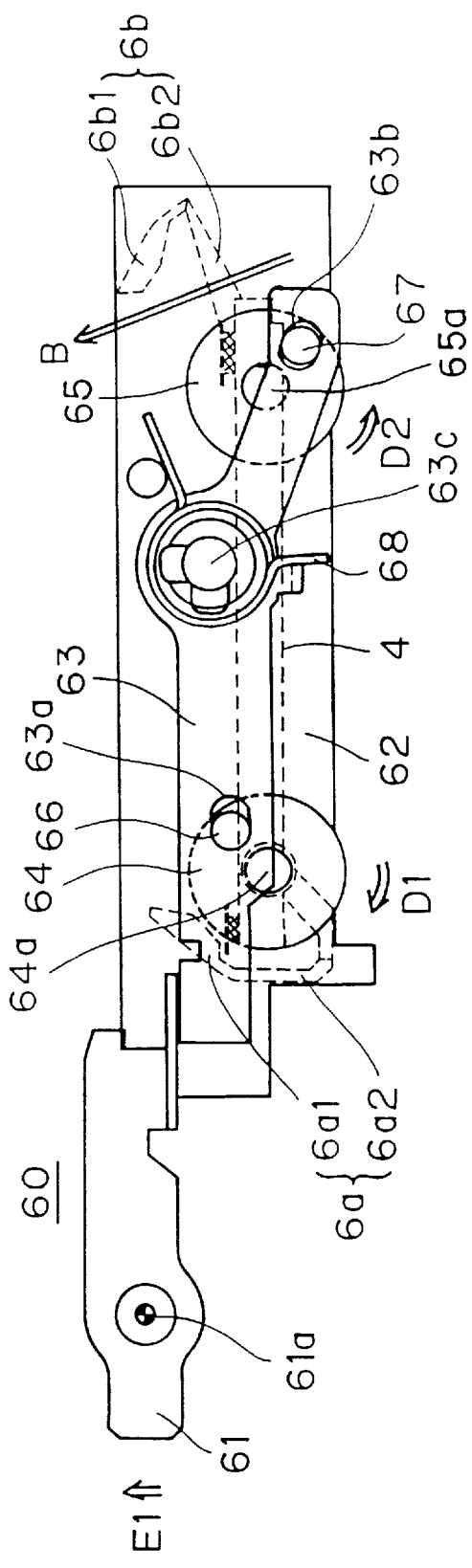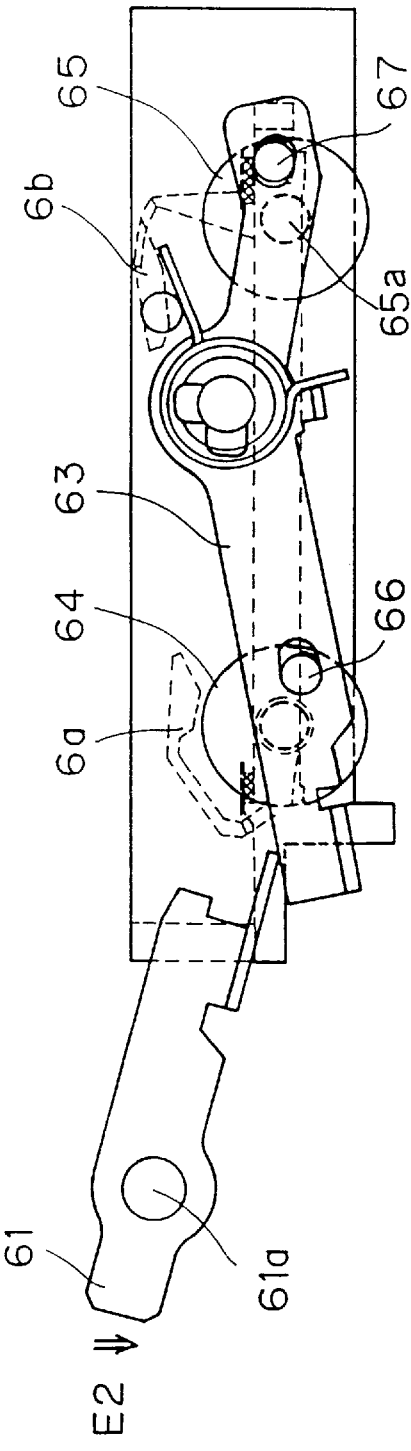

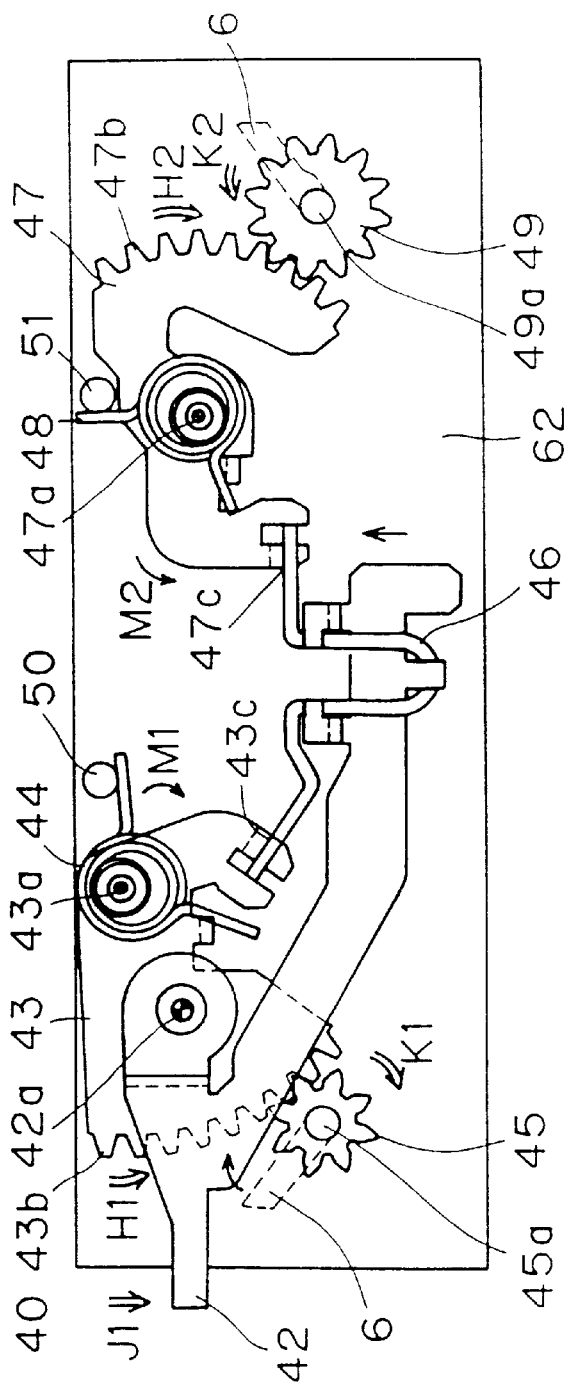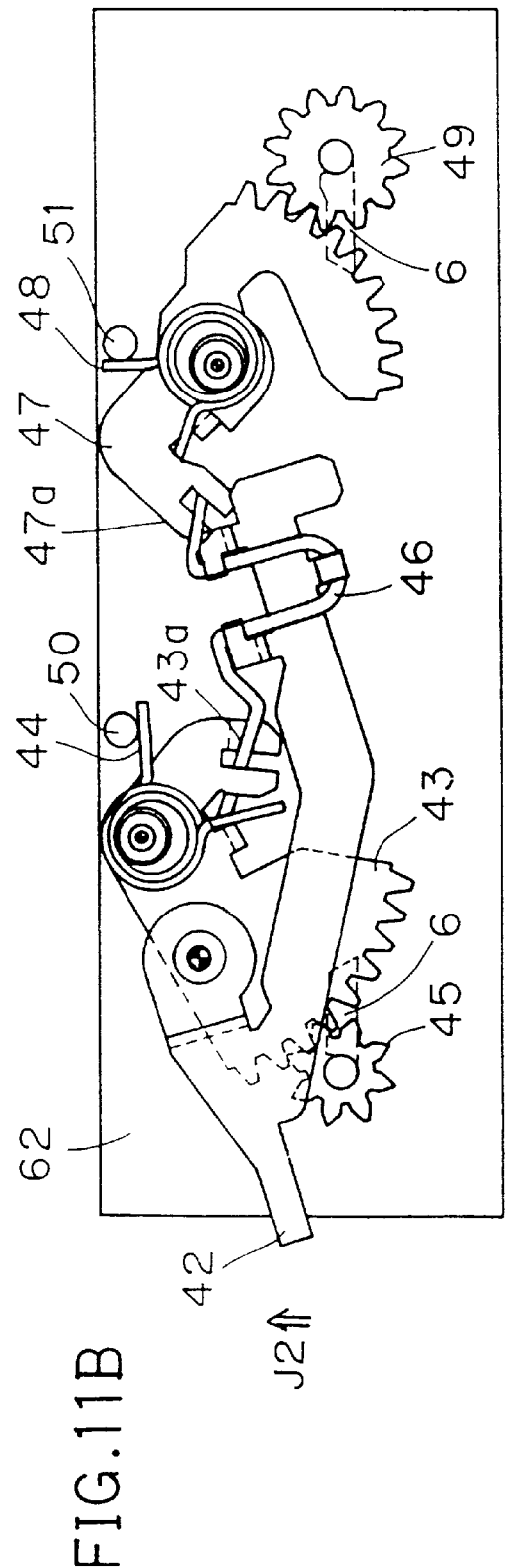

FIELD FRAME SWITCHER

This application is based on application No. H9-330288 filed in Japan, the contents of which are hereby incorporated by reference.

BACKGROUND OF THE INVENTION

1. Field of the Invention

The present invention relates to a finder field frame switcher for cameras, and more particularly, to a finder field frame switcher in the advanced photo system having a plurality of image plane formats.

2. Description of the Prior Art

In the advanced photo system (hereinafter, referred to as APS) that have been commercialized in recent years, the image size format can be selected from among the following three types: a wide type (hereinafter, referred to as "H type") with a length-to-width ratio of 9:16; a standard type (hereinafter, referred to as "C type") with a length-to-width ratio of 2:3 in which, compared to the H type, the length is the same and the width is shorter; and a panorama type (hereinafter, referred to as "P type") with a length-to-width ratio of 1:3 in which, compared to the H type, the width is the same and the length is shorter.

When an image size is selected by the user, it is necessary to switch the finder field frame. A conventional camera having a finder field frame switcher is arranged, for example, as shown in FIG. 1. According to FIG. 1, a luminous flux A emanating from a subject and entering a camera 1 through a taking lens 2 is reflected at a reflecting mirror 3 and imaged at a focusing screen 4.

In photographing, since the reflecting mirror 3 rotates so as to retreat to the vicinity of the focusing screen 4 and a shutter 12 is released for a predetermined time, the luminous flux A reaches a film 9 to expose the film 9. In the APS, since image size information is recorded onto the film 9 by magnetic writing by use of a magnetic head (not shown) or by identification mark recording by use of a light emitting device (not shown), even if the film 9 is not shielded from light according to the image size format, the image size is decided based on the recorded image size information and printing onto photographic paper is performed.

On the other hand, in another system, for example, in a 135-type system, to switch between the standard image plane and the panoramic image plane, a field frame switching mechanism is necessarily provided in the front or in the rear of the shutter 12.

In the rear of the focusing screen 4 on the optical path of the luminous flux A, a fixed field frame 5 having an H-type field frame and light interrupting wings 6 being rotatable are provided so that the light interrupting wings 6 rotate to switch between the H-type field frame and a P-type field frame. In the figure, the P-type field frame is selected when the light interrupting wings 6 are lying. The light interrupting wings 6 are also provided in positions parallel to the plane of the figure so as to switch between the H-type field frame and a C-type field frame. The image formed at the focusing screen 4 is reflected at a pentagonal Dach mirror 11 and enlarged by an eyepiece 8 so that the user can confirm the image of the desired field frame.

In order to automatically adjust exposure, a part (luminous flux A2) of the luminous flux A having been imaged at the focusing screen 4 is captured by the automatic exposure (AE) sensor 10 to detect brightness. Further describing with reference to a detailed view shown in FIG. 2, the focusing screen 4 and the AE sensor 10 are disposed so that the luminous flux A2 to be captured by the AE sensor 10 is not interrupted by the light interrupting wing 6 when the light interrupting wing 6 is standing upright to form the H-type or the C-type field frame.

Subsequently, another conventional example will be described. As shown in FIG. 3, a finder field 21 which can be viewed by the user includes an image display portion 22 having an image plane corresponding to the H type, and information display portions 25a and 25b. When the C-type or the P-type field frame is selected, the focusing screen 4 (see subsequently-described FIG. 4) is shielded from light, so that a field 23 or 24 is displayed on the image display portion 22.

On the information display portions 25a and 25b, information such as the aperture value, the shutter speed, the flash indicator and the in-focus indicator is displayed so that the user is informed of the information.

A method of displaying information on the information display portions 25a and 25b will be described with reference to FIG. 4. In FIG. 4, the fixed field frame 5 and light interrupting wings 6a and 6b are disposed above the focusing screen 4 in the structure of the camera 1 similar to that of FIG. 1. The light interrupting wings 6a and 6b are rotatable between a position that covers a field limiting portion 5a of the fixed field frame 5 and a position that is retreated from the field limiting portion 5a so that the field frame can be switched between the P type and the H type.

At a side of the focusing screen 4, a display member 32 such as a transmission-type liquid crystal panel is attached to the camera 1 by a fixing member 34. A luminous flux B from a backlight 33 is reflected at a mirror 31 to reach the eyepiece 8 together with the luminous flux A1 of the image on the focusing screen 4, so that information is displayed on the information display portion 25a in a lower part of the finder field 21 in the previously-described FIG. 3.

Moreover, by a similar structure, switching between the C-type field frame and the H-type field frame can be performed by the light interrupting wings 6a and 6b. Further, by a similar structure, information can be displayed on the information display portion 25b in a side part of the finder field 21.

In the arrangement in which the AE sensor 10 and the display member 32 are disposed in the vicinity of the focusing screen 4 as shown in FIGS. 2 and 4, the light interrupting wings 6a and 6b are disposed in positions that do not interrupt the luminous fluxes A2 and B since the luminous fluxes A2 and B used for obtaining information necessary for photographing cannot perform their functions if they are interrupted by the light interrupting wings 6a and 6b. However, such an arrangement requires a large space (L1 and L2 of FIGS. 2 and 4) in the rear of the focusing screen 4 on the optical path of the luminous flux A from the subject. This has been an obstacle to size reduction of the camera.

SUMMARY OF THE INVENTION

An object of the present invention is, in a camera having a field frame switching mechanism, to secure space for the members of the field frame switching mechanism and the switching path without increasing the size of the camera. More specifically, an object of the present invention is, in the arrangement in which the AE sensor 10 and the display member 32 are disposed in the vicinity of the focusing screen 4, by reducing the overall size of the camera by providing a field frame switcher in which the optical path of the luminous flux A from the subject is shortened in the rear of the focusing screen by reducing the distance between the focusing screen 4 and an eyepiece 8.

To achieve the above-mentioned object, according to the present invention, in a field frame switcher having a light interrupting wing capable of changing a field frame, the light interrupting wing crosses and interrupts a predetermined luminous flux path used for obtaining information necessary for photographing while the field frame is being changed.

According to this structure, the light interrupting wing is disposed close to the predetermined luminous flux path necessary for photographing and space in the camera can be reduced accordingly. When the field frame is switched, the light interrupting wing crosses the luminous flux path while moving to temporarily interrupt the luminous flux. However, since photographing has not been started yet when the field frame is switched, the luminous flux traveling on the luminous flux pass is not for use. Therefore, no problem arises if the luminous flux is interrupted by the light interrupting wing. Since the luminous flux traveling on the luminous flux path necessary for photographing is not interrupted by the light interrupting wing when field frame switching is finished and the light interrupting wing is stationary, photographing can be performed without any problem.

According to the present invention, the luminous flux path is the optical path of a luminous flux for displaying camera information in the finder field.

According to this structure, the light interrupting wing is disposed close to the focusing screen so as to interrupt the optical path of the luminous flux for displaying camera information in the finder field and space in the camera can be reduced accordingly. When the field frame is switched, the light interrupting wing crosses the optical path while moving to temporarily interrupt the luminous flux so that camera information is not displayed in the finder field. However, since photographing has not been started yet when the field frame is switched, no problem arises if the luminous flux is interrupted by the light interrupting wing. Since the luminous flux traveling on the optical path is not interrupted by the light interrupting wing when field frame switching is finished and the light interrupting wing is stationary, photographing can be performed with camera information displayed in the finder field without any problem.

According to the present invention, the luminous flux path is the optical path of a luminous flux to be captured by an AE sensor for detecting the brightness.

According to this structure, the light interrupting wing is disposed close to the optical path of the luminous flux to be captured by the AE sensor and space in the camera can be reduced accordingly. When the field frame is switched, the light interrupting wing crosses the optical path while moving to temporarily interrupt the luminous flux so that automatic exposure adjustment is not performed. However, since photographing has not been started yet when the field frame is switched, the luminous flux traveling on the optical pass at that time is not for use. Therefore, no problem arises if the luminous flux is interrupted by the light interrupting wing. Since the luminous flux traveling on the optical path to be captured by the AE sensor is not interrupted by the light interrupting wing when field frame switching is finished and the light interrupting wing is stationary, automatic exposure adjustment is performed, so that photographing can be performed without any problem.

According to the present invention, the light interrupting wing is a rotary wing that rotates more than 90 degrees.

According to this structure, when the field frame is switched, the rotary wing rotates so as to interrupt the predetermined luminous flux path and when field frame switching is finished, the height of the rotary wing is reduced in a direction vertical to the focusing screen since the rotation angle of the rotary wing is larger than 90 degrees, so that photographing can be performed without the luminous flux path interrupted.

BRIEF DESCRIPTION OF THE DRAWINGS

These and other objects and features of this invention will become clear from the following description, taken in conjunction with the preferred embodiments with reference to the accompanied drawings in which:

FIGS. 6A and 6B are views of assistance in explaining a drive mechanism for driving the field frame switcher according to the first embodiment of the present invention;

FIGS. 11A and 11B are views of assistance in explaining a drive mechanism for driving the field frame switcher according to the fifth embodiment of the present invention;

DESCRIPTION OF THE PREFERRED EMBODIMENTS

Figure 1:
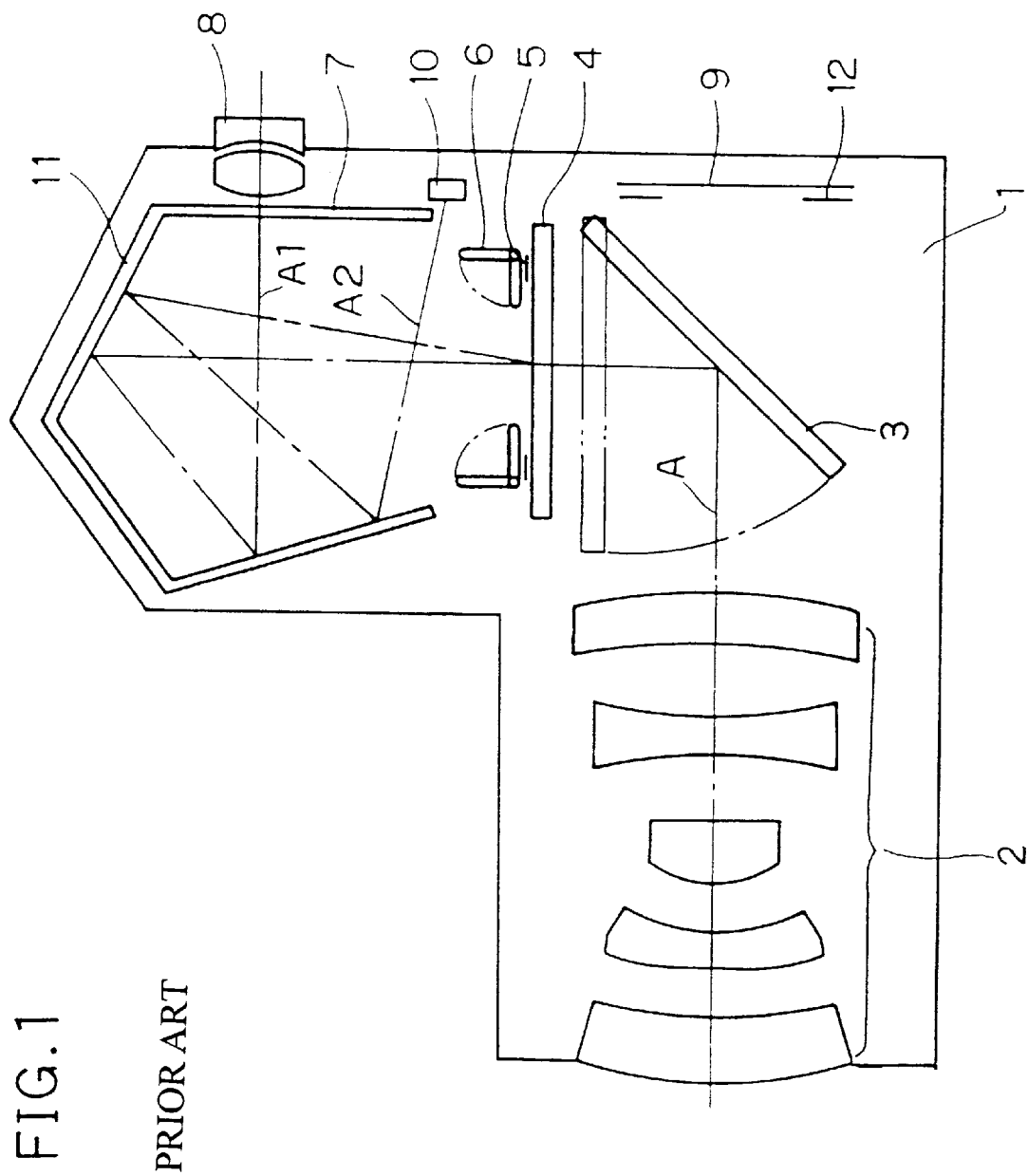
FIG. 1 is a cross-sectional view showing the structure of the conventional camera.

A first embodiment of the present invention will be described with reference to FIG. 5. In FIG. 5, the same members as those of FIG. 4 are denoted by the same reference numerals.

According to the figure, the display member 32 is situated lower than that of the conventional arrangement (see FIG. 4), and the light interrupting wing 6b is disposed above the display member 32. When the field frame is switched, the light interrupting wing 6b interrupts the luminous flux B from the backlight 33, so that information is not displayed in the finder. However, the time during which the luminous flux B is interrupted is extremely short and when the field frame switching is finished, information is displayed in the finder since the luminous flux B from the backlight 33 is not interrupted. Thus, photographing can be performed without any problem.

Figure 4:
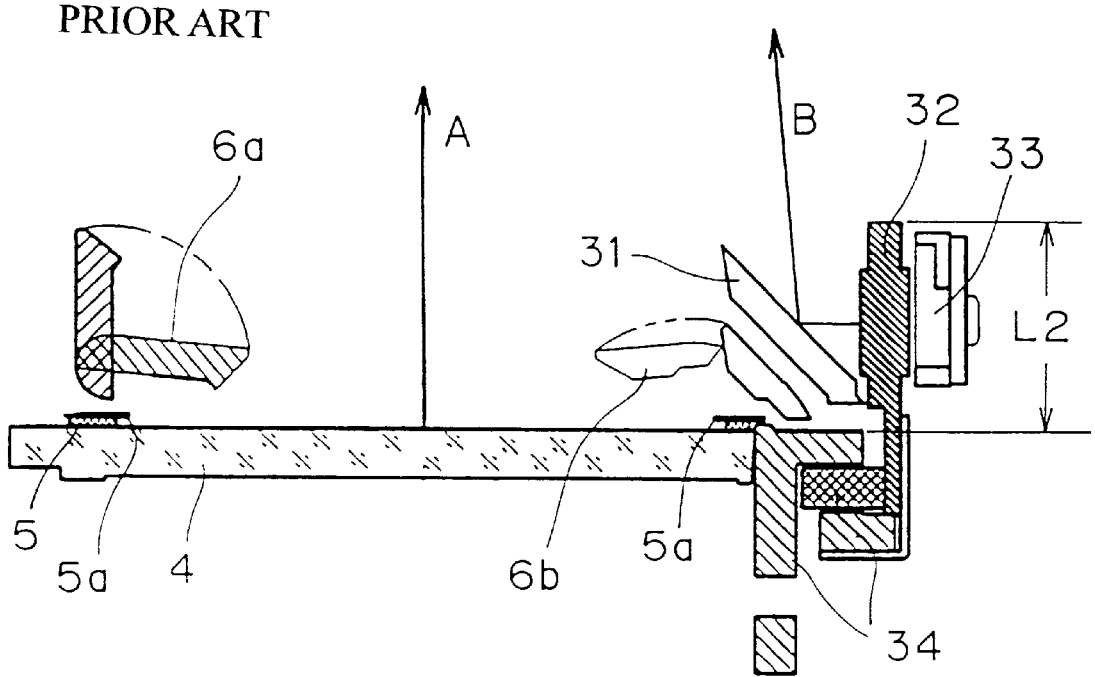
FIG. 4 is a cross-sectional view showing the structure of another example of the conventional field frame switcher.
Figure 5:
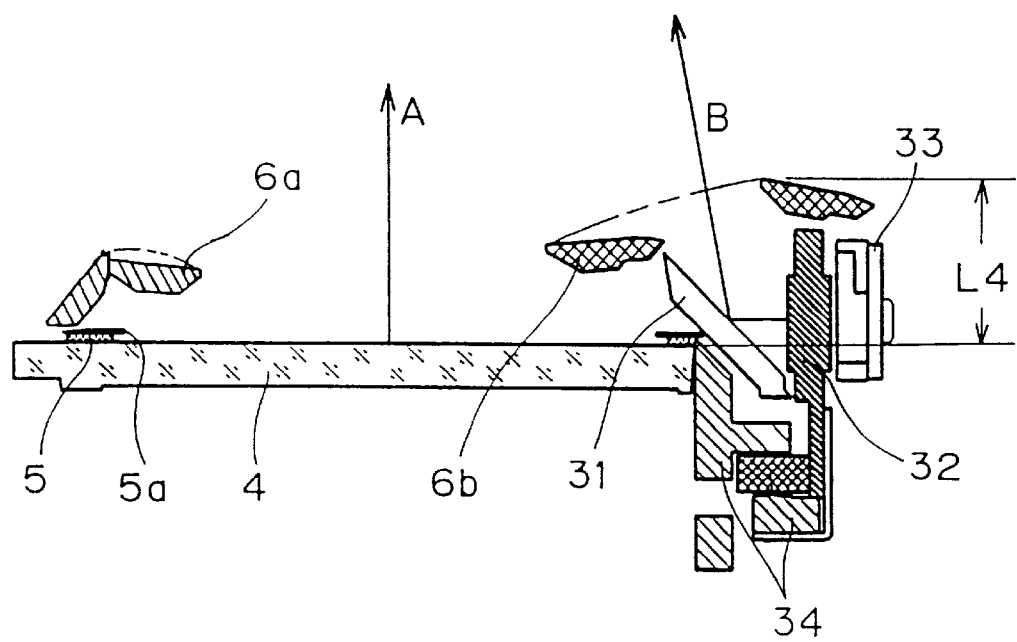
FIG. 5 is a cross-sectional view showing the structure of a field frame switcher according to a first embodiment of the present invention.

As described above, by disposing the light interrupting wing 6b in a position that temporarily interrupts the luminous flux B from the backlight 33, the space L4 in the rear of the focusing screen 4 on the optical path of the luminous flux A from the subject can be reduced compared to the conventional arrangement (see FIG. 4).

The light interrupting wings 6a and 6b of the above-described first embodiment can be driven, for example, by a mechanism as shown in FIGS. 6A and 6B. FIGS. 6A and 6B show a drive mechanism 60 provided at one end, along the length, of the light interrupting wings 6a and 6b.

According to FIG. 6A, a focusing screen holder 62 for holding the focusing screen 4 so as to be positioned has two rotary members 64 and 65 integrated with rotation axes 64a and 65a and rotatable about the rotation axes 64a and 65a. The rotation axes 64a and 65a pass through the focusing screen holder 62 to be also integrated with the light interrupting wings 6a and 6b. The rotary members 64 and 65 have drive pins 66 and 67. The light interrupting wings 6a and 6b are rotated by the rotation of the drive pins 66 and 67.

The focusing screen holder 62 also has a drive lever 63 being rotatable about a rotation center 63c and engaging with an operation lever 61 that rotates about a rotation center 61a. The drive lever 63 has guide grooves 63a and 63b for guiding the drive pins 66 and 67. A return spring 68 engages with the drive lever 63 so that the drive lever 63 receives a force in the clockwise direction of the figure.

When the operation lever 61 is rotated in the direction of the arrow E1, the drive lever 63 engaging with the operation lever 61 rotates in the counterclockwise direction, so that the drive pins 66 and 67 being guided by the guide grooves 63a and 63b are rotated in the directions of the arrows D1 and D2. This moves the light interrupting wings 6a and 6b to the positions shown in FIG. 6B. Under this condition, the operation lever 61 can be held at the position shown in FIG. 6B by a holding mechanism (not shown) such as a click mechanism.

When the operation lever 61 is rotated from the position shown in FIG. 6B in the direction of the arrow E2, the drive lever 63 is rotated in the clockwise direction by the return spring 68. This moves the light interrupting wings 6a and 6b to the positions shown in FIG. 6A.

In the light interrupting wings 6a and 6b, arms 6a2 and 6b2 formed only on both ends, along the length, of wings 6a1 and 6b2 hold the wings 6a1 and 6b1, so that the light interrupting wings 6a and 6b does not interrupt the luminous flux B from the backlight (see FIG. 5) when they are situated at the positions shown in FIG. 6A.

By the above-described drive mechanism 60, the light interrupting wing 6b can be disposed above the display member 32 as shown in the previously-described FIG. 5, so that space can be saved.

Figure 7:
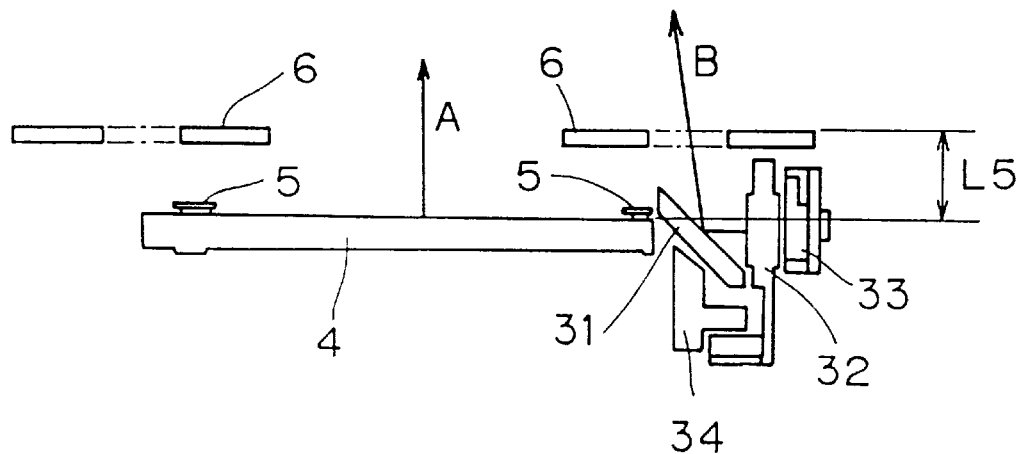
FIG. 7 is a cross-sectional view showing the structure of a field frame switcher according to a second embodiment of the present invention.
Figure 8:
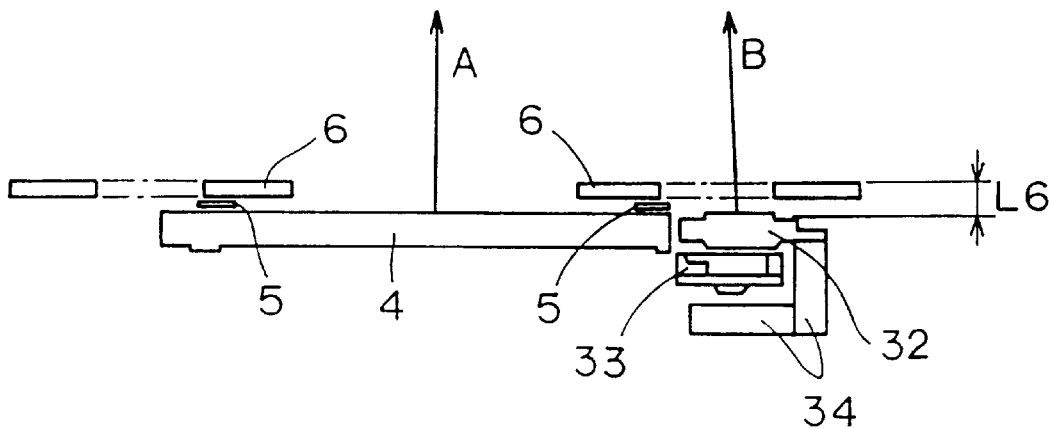
FIG. 8 is a cross-sectional view showing the structure of a field frame switcher according to a third embodiment of the present invention.
Figure 9:
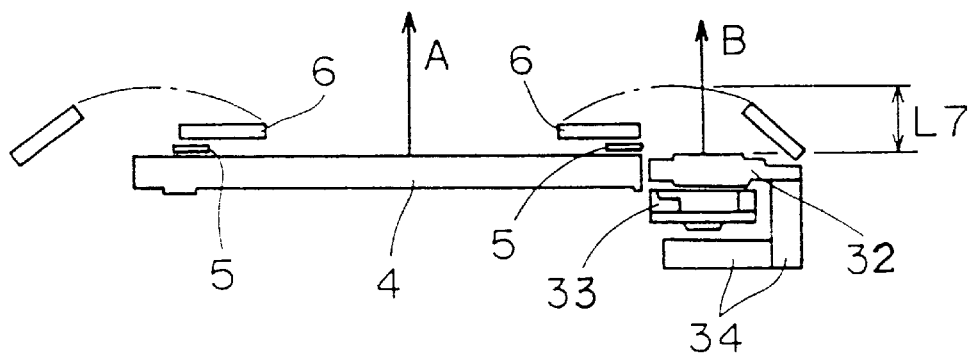
FIG. 9 is a cross-sectional view showing the structure of a field frame switcher according to a fourth embodiment of the present invention.

The light interrupting wing 6 may be structured so as to move on a plane surface like in a second embodiment shown in FIG. 7, or the display member 33 may be disposed parallel to the focusing screen like in third and fourth embodiments shown in FIGS. 8 and 9. In any of these arrangements, by disposing the light interrupting wing 6 in a position that temporarily interrupts the luminous flux B from the backlight 33, the spaces L5, L6 and L7 in the rear of the focusing screen 4 on the optical path of the luminous flux A from the subject can be reduced compared to the conventional arrangement. In FIGS. 7, 8 and 9, the same members as those of FIG. 5 are denoted by the same reference numerals.

Figure 2:
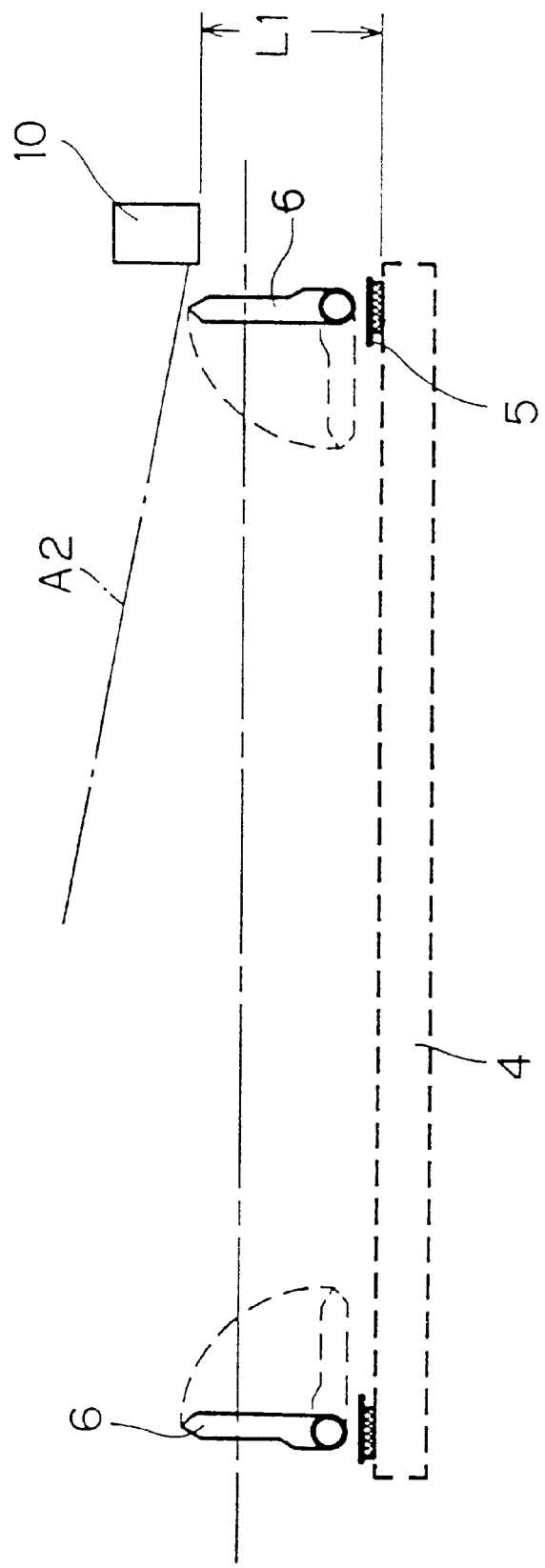
FIG. 2 is a cross-sectional view showing the structure of an example of the conventional field frame switcher.
Figure 3:
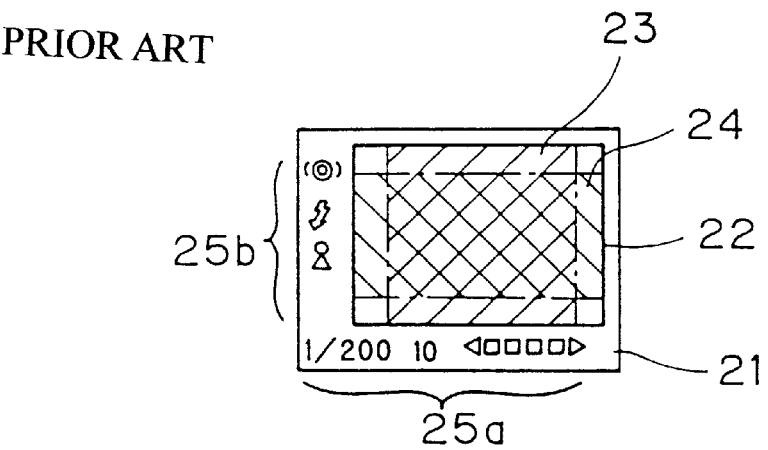
FIG. 3 is a schematic view showing the finder field of the camera.
Figure 10:
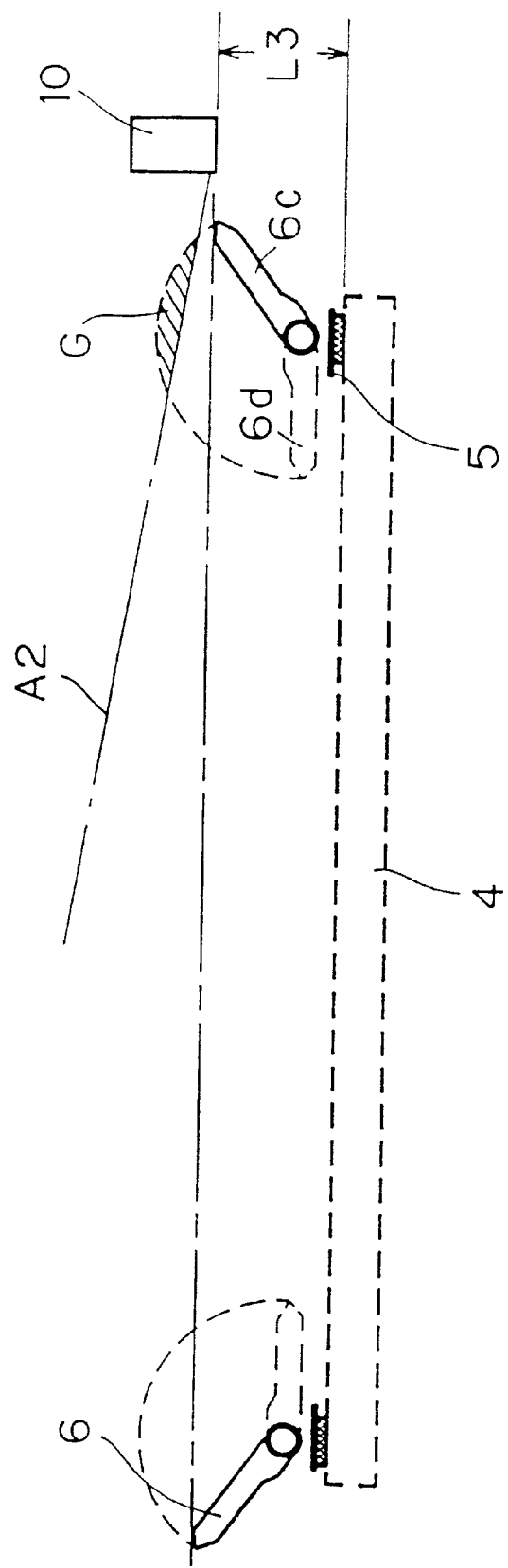
FIG. 10 is a cross-sectional view showing the structure of a field frame switcher according to a fifth embodiment of the present invention.

Subsequently, a fifth embodiment of the present invention will be described with reference to FIG. 10. FIG. 10 shows an arrangement in which the distance L3 between the AE sensor 10 and the focusing screen 4 is shorter than that in the conventional arrangement (see FIG. 2).

According to the figure, by reducing the distance L3 between the AE sensor 10 and the focusing screen 4, the light interrupting wing 6 is rotated more than 90 degrees. In the rotation range G, the light interrupting wing 6 interrupts a luminous flux A2 to be captured by the AE sensor 10, so that automatic exposure adjustment is not performed. However, since the luminous flux A2 to be captured by the AE sensor 10 is not interrupted at positions (6c and 6d) where the light interrupting wing 6 is stationary, automatic exposure adjustment is performed when field frame switching is finished. Therefore, photographing can be performed without any problem.

In such a drive mechanism for the light interrupting wing 6, it is difficult to rotate the light interrupting wing 6 more than 90 degrees by a drive method such that the drive pins 66 and 67 are rotated by being guided by the guide grooves 63a and 63b like in the above-described drive mechanism 60 shown in FIG. 6. Therefore, the light interrupting wing 6 can be driven, for example, by a drive mechanism 40 as shown in FIGS. 11A and 11B.

According to FIG. 11A, the focusing screen holder 62 for holding the focusing screen (see FIGS. 6A and 6B) so as to be positioned has two gears 45 and 49 integrated with rotation axes 45a and 49a and rotatable about the rotation axes 45a and 49a. The rotation axes 45a and 49a pass through the focusing screen holder 62 to be also integrated with the light interrupting wings 6.

The focusing screen holder 62 also has an operation lever 42 that rotates about a rotation center 42a and drive levers 43 and 47 being rotatable about rotation centers 43a and 47a. The drive levers 43 and 47 have toothed portions 43b and 47b engaging with the gears 45 and 49.

An overcharge spring 46 is fixed to the operation lever 42. The overcharge spring 46 engages with engagement portions 43c and 47c of the drive levers 43 and 47 so that the movement of the operation lever 42 is transmitted to the drive levers 43 and 47. Return springs 44 and 48 engage with the drive levers 43 and 47, so that a force that rotates the drive levers 43 and 47 in the directions of the arrows M1 and M2 acts on the drive levers 43 and 47.

When the operation lever 42 is rotated in the direction of the arrow J1, the drive levers 43 and 47 engaging with the overcharge spring 46 rotate in the directions of the arrows H1 and H2. Since the pitch circle diameters of the gears 45 and 49 are smaller than the pitch circle diameters of the toothed portions 43b and 47b, the gears 45 and 49 are rotated through accordingly larger angles in the directions of the arrows K1 and K2, so that the light interrupting wings 6 can be rotated more than 90 degrees as shown in FIG. 11B. Under this condition, the operation lever 42 can be held at the position shown in FIG. 11B by a holding mechanism (not shown) such as a click mechanism.

When the operation lever 42 is rotated in the direction of the arrow J2 from the position shown in FIG. 11B, the drive levers 43 and 47 are rotated in the directions of the arrows M1 and M2 by the return springs 44 and 48. This moves the light interrupting wings 6 to the positions shown in FIG. 11A.

By the above-described drive mechanism 40, the light interrupting wings 6 can be rotated more than 90 degrees and the AE sensor can be disposed close to the focusing screen 4 as shown in the previously-described FIG. 10, so that space can be saved.

Figure 12:
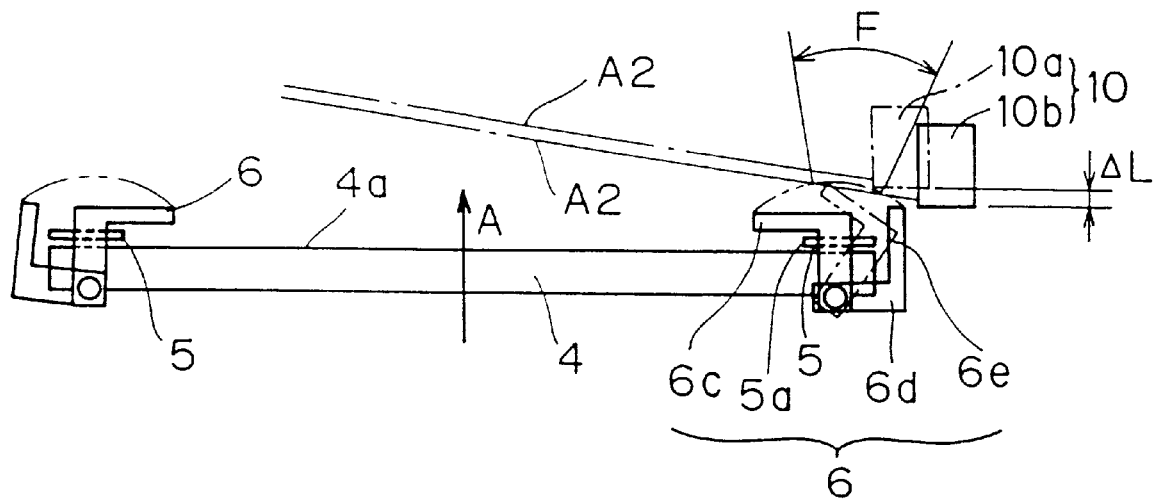
FIG. 12 is a cross-sectional view showing the structure of a field frame switcher according to a sixth embodiment of the present invention.

Subsequently, a sixth embodiment of the present invention will be described with reference to FIG. 12. In FIG. 12, the light interrupting wings 6 of the fifth embodiment are replaced by L-shaped light interrupting wings 6 which are formed so that the field frame can be switched between a position (6c) that covers the field limiting portion 5a of the fixed field frame 5 and a position (6e) that is retreated from the field limiting portion 5a. By providing the L-shaped light interrupting wings 6 like in FIG. 6, the rotation centers of the light interrupting wings 6 can be situated in the front of an imaging plane 4a of the focusing screen 4 on the optical path of the luminous flux A from the subject, so that the space in the rear on the optical path of the luminous flux A which space is necessary for the rotation of the light interrupting wings 6 can be reduced.

When the distance between the AE sensor 10 and the focusing screen 4 is reduced, since the position (6e) that is retreated from the field limiting portion 5a interrupts the luminous flux A2 to be captured by the AE sensor 10, it is necessary to rotate the light interrupting wing 6 to the position 6d and it is necessary to shift the AE sensor 10 from a position 10a to a position 10b to prevent interference between the light interrupting wing 6 and the AE sensor 10. Although this arrangement requires more space in the horizontal direction of the figure, the space in the vertical direction can be reduced by ΔL.

When the field frame is switched, the light interrupting wing 6 crosses the luminous flux A2 to be captured by the AE sensor 10 while being rotated in the rotation range F. However, the luminous flux A2 is not interrupted when the light interrupting wing 6 is stationary (at the positions 6c and 6d), photographing can be performed without any problem arising in automatic exposure operation.

The light interrupting wings 6 as shown in the figure can be driven by a mechanism similar to the drive mechanism of the first embodiment (see FIGS. 6A and 6B).

Figure 13:
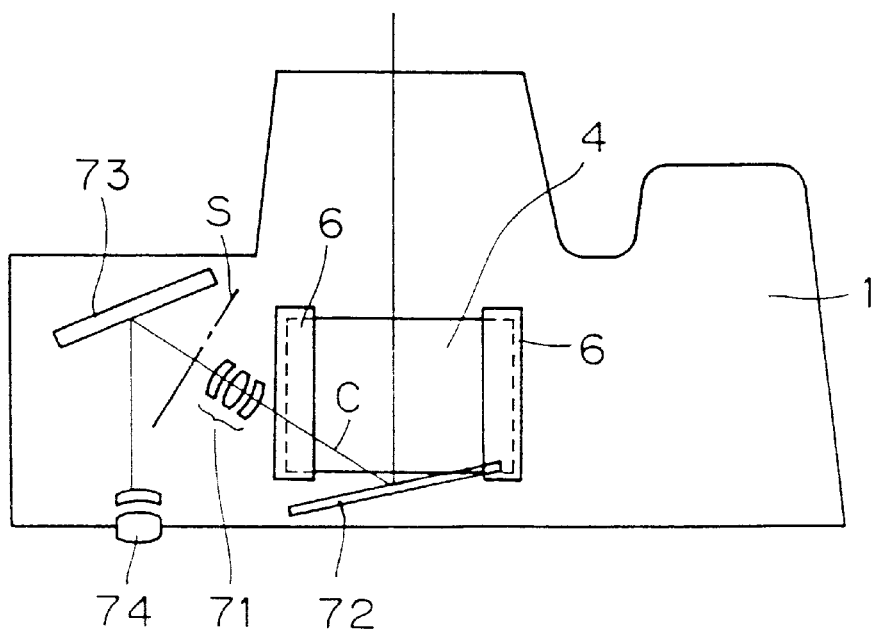
FIG. 13 is a cross-sectional view showing the structure of a field frame switcher according to a seventh embodiment of the present invention.

Subsequently, a seventh embodiment will be described with reference to FIG. 13. FIG. 13 is a top view of a camera 1 having instead of the pentagonal Dach mirror a relay lens optical system with an optical path bent in the shape of the letter N by a relay lens 71.

A luminous flux C from the subject reflected at a mirror 72 passes above the light interrupting wings 6 disposed on the left and right sides of the focusing screen 4, and space in the camera can also be reduced by reducing the distance between the light interrupting wings 6 and the luminous flux C until the light interrupting wings 6 are situated in positions that cross the luminous flux C only when the field frame is just being switched. Moreover, the light interrupting wings 6 can be disposed on a secondary imaging plane S in the figure. In the figure, reference numerals 73 and 74 represent a reflecting mirror and an eyepiece, respectively.

Obviously, many modifications and variations of the present invention are possible in light of the above teachings. It is therefore to be understood that within the scope of the appended claims, the invention may be practiced other than as specifically described.

What is claimed is:

1. A field frame switcher comprising:
   a field frame switching member for switching a field frame between a first condition and a second condition;
   a luminous flux path having a predetermined flux path portion leading to a sensor for sensing light from a subject; and
   a drive member for driving said field frame switching member so as to cross said predetermined flux path portion when said field frame is being switched between the first and the second conditions,
   wherein said predetermined flux path portion is beyond said drive member.

2. A field frame switcher as claimed in claim 1, wherein said field frame switcher further comprises a fixed field frame for setting said field frame in said first condition.

3. A field frame switcher as claimed in claim 1, wherein said sensor is an automatic exposure sensor.

4. A field frame switcher as claimed in claim 1, wherein said field frame switching member is a rotary member that rotates more than 90 degrees.

5. A field frame switcher as claimed in claim 1, wherein said field frame switching member is L-shaped.

6. A field frame switcher as claimed in claim 1, wherein said field frame switching member is a light interrupting member.

7. A field frame switcher comprising:
   a light interrupting member for changing a field frame;
   a luminous flux path having a predetermined flux path portion leading to a sensor for sensing light from a subject; and
   a drive member for driving said light interrupting member so as to cross said predetermined flux path portion while said field frame is being changed,
   wherein said predetermined flux path portion is beyond said drive member.

8. A field frame switcher as claimed in claim 7, wherein said sensor is an automatic exposure sensor.

9. A field frame switcher as claimed in claim 7, wherein said light interrupting member is a rotary member that rotates more than 90 degrees.

10. A field frame switcher as claimed in claim 7, wherein said light interrupting member is driven in a horizontal direction.

11. A field frame switcher as claimed in claim 7, wherein said light interrupting member is L-shaped.

12. A field frame switcher comprising:
    a field frame switching member for switching a field frame between a first condition and a second condition;
    a luminous flux not containing a subject image traversing a predetermined luminous flux path other than a luminous flux path that forms a subject image; and
    a drive member for driving said field frame switching member so as to cross said luminous flux path not containing a subject image path when said field frame is being switched between the first and the second conditions.

13. A field frame switcher as claimed in claim 12, wherein said luminous flux path is a luminous flux path for displaying information in a finder field.

14. A field frame switcher as claimed in claim 12, wherein said field frame switching member is driven in a horizontal direction.

15. A field frame switcher as claimed in claim 12, wherein said field frame switcher further comprises a fixed field frame for setting said field frame in said first condition.

16. A field frame switcher as claimed in claim 12, wherein said field frame switching member is L-shaped.

17. A field frame switcher as claimed in claim 12, wherein said field frame switching member is a light interrupting member.

18. A field frame switcher comprising:

a light interrupting member for changing a field frame;

a luminous flux not containing a subject image traversing a predetermined luminous flux path other than a luminous flux path that forms a subject image; and a drive member for driving said light interrupting member so as to cross said luminous flux not containing a subject image path while said field frame is being changed.

19. A field frame switcher as claimed in claim 18, wherein said luminous flux path is a luminous flux path for displaying information in a finder field.

20. A field frame switcher as claimed in claim 18, wherein said light interrupting member is driven in a horizontal direction.

21. A field frame switcher as claimed in claim 18, wherein said light interrupting member is L-shaped.

* * * * *